United States Patent
Yew et al.

(10) Patent No.: US 9,742,442 B2
(45) Date of Patent: Aug. 22, 2017

(54) DIGITAL RADIO TAGGING USING AN RF TUNER ACCESSORY

(71) Applicant: Apple Inc., Cupertino, CA (US)

(72) Inventors: Jason J. Yew, Cupertino, CA (US); Allen P. Haughay, Jr., San Jose, CA (US); Robert J. Walsh, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/625,327

(22) Filed: Feb. 18, 2015

(65) Prior Publication Data
US 2015/0162938 A1    Jun. 11, 2015

Related U.S. Application Data

(62) Division of application No. 12/372,689, filed on Feb. 17, 2009, now Pat. No. 8,983,639.
(Continued)

(51) Int. Cl.
*G06F 17/00* (2006.01)
*H04B 1/00* (2006.01)
(Continued)

(52) U.S. Cl.
CPC ............. *H04B 1/006* (2013.01); *H04H 60/27* (2013.01); *H04H 60/64* (2013.01); *H04H 60/74* (2013.01); *H04N 5/50* (2013.01)

(58) Field of Classification Search
CPC .......... H04N 5/50; H04B 1/006; H04H 60/27; H04H 60/64; H04H 60/74
See application file for complete search history.

(56) References Cited

U.S. PATENT DOCUMENTS

| 4,673,861 A | 6/1987 | Dubovsky et al. |
| 5,303,393 A | 4/1994 | Noreen et al. |

(Continued)

FOREIGN PATENT DOCUMENTS

| EP | 1049278 A1 | 11/2000 |
| EP | 1367734 A1 | 12/2003 |

(Continued)

OTHER PUBLICATIONS

U.S. Appl. No 12/553,380, filed Sep. 3, 2009, Bolton et al.
(Continued)

*Primary Examiner* — Joseph Saunders, Jr.
(74) *Attorney, Agent, or Firm* — Blakely, Sokoloff, Taylor & Zafman LLP

(57) ABSTRACT

An accessory having an RF tuner for digital radio, such as HD radio, can be in communication with a media player such as a portable media device ("PMD"). The user can be given the ability to command the accessory to provide raw digital data, the ability to scan only for stations having digital audio content (or for all available stations), the ability to provide station lists of stations having digital audio content (or all available stations), and the ability to request and store metadata beyond that for stations actually being listened to provide enhanced search capabilities. Enhanced metadata and searching can provide the listener the ability to refine station choices without having to listen at length to any particular station, and further can facilitate tagging broadcast tracks for subsequent access and/or purchase.

21 Claims, 7 Drawing Sheets

Related U.S. Application Data

(60) Provisional application No. 61/122,395, filed on Dec. 14, 2008.

(51) Int. Cl.
| | |
|---|---|
| *H04H 60/27* | (2008.01) |
| *H04H 60/64* | (2008.01) |
| *H04H 60/74* | (2008.01) |
| *H04N 5/50* | (2006.01) |

(56) References Cited

U.S. PATENT DOCUMENTS

| | | |
|---|---|---|
| 5,794,127 A | 8/1998 | Lansang |
| 6,112,064 A | 8/2000 | Arrowsmith et al. |
| 6,230,205 B1 | 5/2001 | Garrity et al. |
| 6,272,328 B1 | 8/2001 | Nguyen et al. |
| 6,505,160 B1 | 1/2003 | Levy et al. |
| 6,591,085 B1 | 7/2003 | Grady |
| 6,782,239 B2 | 8/2004 | Johnson et al. |
| 6,788,528 B2 | 9/2004 | Enners et al. |
| 6,813,528 B1 | 11/2004 | Yang |
| 7,013,164 B2 | 3/2006 | Lin |
| 7,062,261 B2 | 6/2006 | Goldstein et al. |
| 7,187,947 B1 | 3/2007 | White et al. |
| 7,293,122 B1 | 11/2007 | Schubert et al. |
| 7,441,058 B1 | 10/2008 | Bolton et al. |
| 7,949,810 B2 | 5/2011 | Bolton et al. |
| 2002/0010759 A1 | 1/2002 | Hitson et al. |
| 2002/0065074 A1 | 5/2002 | Cohn et al. |
| 2002/0132575 A1 | 9/2002 | Kesling et al. |
| 2002/0132651 A1 | 9/2002 | Jinnouchi |
| 2002/0151327 A1 | 10/2002 | Levitt |
| 2002/0183059 A1 | 12/2002 | Noreen et al. |
| 2003/0040272 A1 | 2/2003 | Lelievre et al. |
| 2003/0059022 A1 | 3/2003 | Nebiker et al. |
| 2003/0220988 A1 | 11/2003 | Hymel |
| 2003/0236075 A1 | 12/2003 | Johnson et al. |
| 2004/0019497 A1 | 1/2004 | Volk et al. |
| 2004/0116005 A1 | 6/2004 | Choi |
| 2004/0117855 A1 | 6/2004 | Nakamura |
| 2004/0127199 A1 | 7/2004 | Kagan et al. |
| 2004/0162029 A1 | 8/2004 | Grady |
| 2005/0014536 A1 | 1/2005 | Grady |
| 2005/0014538 A1 | 1/2005 | Hyun et al. |
| 2005/0020223 A1 | 1/2005 | Ellis et al. |
| 2005/0047071 A1 | 3/2005 | Tse Chun Hin |
| 2005/0181756 A1 | 8/2005 | Lin |
| 2005/0227612 A1 | 10/2005 | Helstrom et al. |
| 2006/0094349 A1 | 5/2006 | Slesak et al. |
| 2006/0184960 A1 | 8/2006 | Horton et al. |
| 2006/0229750 A1* | 10/2006 | Rozier ............... H04H 20/28 700/94 |
| 2006/0235864 A1 | 10/2006 | Hotelling et al. |
| 2007/0077784 A1 | 4/2007 | Kalayjian et al. |
| 2007/0206827 A1 | 9/2007 | Tupman et al. |
| 2007/0274420 A1* | 11/2007 | Billings ............... H03J 1/0008 375/344 |
| 2008/0015717 A1 | 1/2008 | Griffin, Jr. et al. |
| 2008/0125031 A1 | 5/2008 | Fadell et al. |
| 2008/0188209 A1 | 8/2008 | Dorogusker et al. |
| 2008/0201745 A1* | 8/2008 | Chien ............... H04N 5/44543 725/53 |
| 2008/0298440 A1 | 12/2008 | Kroeger et al. |
| 2009/0061763 A1 | 3/2009 | Dillon et al. |
| 2011/0053510 A1 | 3/2011 | Bolton et al. |

FOREIGN PATENT DOCUMENTS

| | | |
|---|---|---|
| EP | 1650971 A1 | 4/2006 |
| EP | 1942393 A1 | 1/2007 |
| EP | 2160024 A2 | 3/2010 |
| JP | 11-288420 | 10/1999 |
| WO | WO 95/01058 | 1/1995 |
| WO | WO 2005024818 A1 | 3/2005 |
| WO | WO 2008/080006 A2 | 7/2008 |

OTHER PUBLICATIONS

U.S. Appl. No. 12/208,987, filed Sep. 11, 2008, Bolton et al.

U.S. Appl. No. 12/553,850, filed Sep. 3, 2009, Bolton et al.

Altec Lansing, "inMotion User Guide," Corp. Headquarters, 8 pages; Milford, PA 18337.

"iPod Radio-Remote-Internals-1260.jpg;" Wikimedia Commons, The Free Media Repository; 4 pages; retrieved on Feb. 25, 2009; retrieved from the Internet http://commons.wikimedia.org/wiki/File:%E7%94%BB%E5%83%8F-IPod-radio-remote-internals-1260.jpg.

"iPod Radio Remote" 14 pages; 2007 Apple Inc.; China.

Partial International Search for Application No. PCT/US2009/059841 mailed on Nov. 3, 2010; 6 pages.

Detweiler, "Conversion Requirements For AM & FM IBOC Transmission," iBiquity Digital Corporation, [online], [retrieved Dec. 12, 2008]. Retrieved from the internet <URL: http://www.ibiquity.com/1/pdfs/Conversion_Requirements.pdf> 7 pages.

Grabianowski, "How HD Radio Works," [online], [retrieved Dec. 8, 2008], Retrieved from the internet, <URL: http://electronics.howstuffworks.com/hd-radio.htm/printable>.

Griffin—radio SHARK, product information sheet, Griffin Technology, [online], [retrieved Jun. 18, 2006]. Retrieved from the Internet <URL: http://www.griffintechnology.com/products/radioshark> 2 pages.

HD Radio® iTunes Tagging for HD Radio™ Broadcasting (Download.PDF) [online], [retrieved on Apr. 14, 2009]. Retrieved from the internet <URL: www.ibiquity.com/broadcaster/itunes®tagging/intro> 4 pages.

HD Radio, Wikipedia Encyclopedia [online], [retrieved on Jan. 17, 2009]. Retrieved from the Internet <URL: http://en.wikipedia.org/wiki/HD_Radio> 9 pages.

Ibiquity Digital, An Advanced Application Services Framework for Application and Service Developers using HD Radio™ Technology, Technical White Paper, Feb. 1, 2003, [online], [retrieved on Dec. 12, 2008]. Retrieved from the Internet <URL: www.hd-radio.com/l/pdfs/SY_TN_5032._000.pdf< 11 pages.

Ibiquity Digital Corporation, HD Radio™ Data Network Requirements, Application Note, Rev.09, Oct. 23, 2006, [online], [retrieved Dec. 12, 2008]. Retrieved from the Internet <URL: http://www.ibiquity.com/l/HD%20Networking%20Requirements%20v9(1).pdf.

IBiquity Digital Corporation, IBOC DAB Field Test Platforms, by Grag A. Nease, [online], [retrieved on Dec. 12, 2008]. Retrieved from the Internet <URL: http://www.ibiquity.com/i/pdfs/Field_Test_Platforms.pdf> 14 pages.

Ibiquity Digital Corporation, ITunes® Tagging, Introductory Information for HD Radio Broadcasters, [online], [retrieved on Jan. 17, 2009]. Retrieved from the Internet <URL: http://www.ibiquity.com/broadcasters/tag> 3 pages.

IBiquity Digital, Emergency Alert System (EAS) Requirements for HD RAdio™, Application Note Template, Rev.01, Nov. 28, 2006, [online], [retrieved Jan. 17, 2009]. Retrieved from the Internet <URL: www.hdradio.com/l/pdfs/EAS%20Paper_TX_TN_2089.pdf> 5 pages.

IBiquity Digital Corporation, HD Radio™ Networking Best Practices, MTM Technologies, prepared by Trieu Vu, Jul. 27, 2006, [online], [retrieved Dec. 12, 2008]. Retrieved from the Internet <URL: http://www.ibiquity.com/l/HD%20Networking%20Best%20Practices.pdf> 13 pages.

IBiquity Digital Corporation, HD Radio™ Networking Implementation Recommendations, MTM Technologies, prepared by Kurt VanderSluis, Jul. 27, 2006, [online], [retrieved Dec. 12, 2008]. Retrieved from the Internet <URL: http://www.ibiquity.com/l/HD%20Network%20Implementation%20Recommendations(1).pdf> 14 pages.

IBiquity Digital Corporation, The Structure and Generation of Robust Waveforms For AM in Band on Channel Digital Broadcasting, by Steve Johnson, [online], [retrieved on Dec. 12, 2008]. Retrieved from the Internet <URL: http://www.ibiquity.com/l/pdfs/Waveforms_AM.pdf> 10 pages.

IBiquity Digital Corporation, The Structure and Generation of Robust Waveforms for FM in-Band on-Channel Digital Broadcast-

(56) References Cited

OTHER PUBLICATIONS ing, by Paul J. Peyla, [online], [retrieved on Dec. 12, 2008]. Retrieved from the Internet <URL: http://www.ibiquity.com/i/pdfs/Waveforms_FM.pdf> 17 pages.

MacXM Features [online], [retrieved on Apr. 11, 2005]. Retrieved from the Internet <URL: http://macxm.sourceforge.net/features.html> 1 page.

MacXM Screenshots [online], [retrieved on Apr. 11, 2005]. Retrieved from the Internet <URL: http://macxm.sourceforge.net/shots.html> 2 pages.

MacXM FAQs [online], [retrieved on Apr. 11, 2005]. Retrieved from the Internet <URL: http://macxm.sourceforge.net/faq.html> 6 pages.

Macworld, Review: Apple iPod Radio Remote, Jan. 25, 2006, [online], [retrieved on Mar. 31, 2009]. Retrieved from the Internet <URL: http://www.macworld.com/article/49108/2006/01/ipodfrmremote.html> 5 pages.

National Radio Systems Committee, "In-Band/On-Channel Digital Radio Broadcasting Standard NRSC-5," Apr. 2005, Consumer Electronics Association and National Association of Broadcasters, [online], retrieved on Jan. 17, 2009]. Retrieved from the Internet <URL: http://www.nrscstandards.org.> 47 pages.

Radio Data System, Radio Electronics.com [online], retrieved Dec. 12, 2008]. Retrieved from the Internet <URL: http://www.radio-electronics.com/info/broadcast/rds/rds.php> 4 pages.

Radio Data System, Wikipedia Encyclopedia [online], retrieved Dec. 12, 2008]. Retrieved from the Internet <URL: http://en.wikipedia.org/wiki/Radio_Data_System> 6 pages.

\* cited by examiner

DIGITAL RADIO TAGGING USING AN RF TUNER ACCESSORY

CROSS REFERENCE TO RELATED APPLICATIONS

This application is a divisional of U.S. application Ser. No. 12/372,689 filed on Feb. 17, 2009, now issued as U.S. Pat. No. 8,893,639, which claims the benefit of U.S. patent application Ser. No. 61/122,395, filed Dec. 14, 2008 for "HD Tagging in an RF Tuner Accessory" (inventors Jason J. Yew, Allen P. Haughay, Jr., and Robert J. Walsh), the entire disclosure of which (including documents themselves incorporated by reference) is incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This disclosure relates generally to radio transmissions, and more specifically to RF tuner accessories that communicate with a media player such as a portable media device ("PMD").

There are a number of technologies whereby AM and FM radio stations are able to transmit digital information along with their analog signals. This is typically done by modulating low-energy sidebands within the normal station bandwidth using known digital modulation schemes.

An early technology deployed in Europe is known as Radio Data System ("RDS"); a U.S. counterpart, officially known as Radio Broadcast Data System ("RBDS"), is very often also referred to as RDS. In an RDS broadcast, a small amount of digital data relevant to the broadcast is included with the analog broadcast. The information (i.e., metadata) is structured (differently in Europe and the U.S.) to include such information as time, track/artist information, station identification, and program type (e.g., news, sports, weather, talk, top 40, country, jazz, classical, and rhythm and blues). It will be appreciated that the RDS system, while not improving the audio quality or providing additional program content, provides useful information to the listener.

Another set of technologies provide digital audio, in addition to the metadata about the content being played. High-quality audio can be transmitted using less bandwidth than conventional AM or FM radio by digitally encoding the audio stream at the source, and then decoding it at the destination. There are a number of formats for digital audio, but a particular in-band on-channel ("IBOC") technology developed by iBiquity Digital Corporation ("iBiquity") has been selected as a standard by the U.S. Federal Communications Commission (FCC). The latest version of the standard is officially referred to as In-Band/On-Channel Digital Radio Broadcasting Standard NRSC-5A promulgated by the National Radio Systems Committee.

As stated in Wikipedia, "HD Radio technology . . . enables AM and FM radio stations to simulcast both digital and analog audio within the same channel (a hybridized digital-analog signal) as well as add new FM channels and text information." HD Radio, at least in stylized forms, is a registered trademark of iBiquity. It is also viewed by some as an acronym for "Hybrid Digital" radio technology. Thus, iBiquity's technology is a species of IBOC technology for transmitting digital radio and analog radio broadcast signals simultaneously within the frequency band allocated to the analog radio station.

SUMMARY

Embodiments provide an accessory having an RF tuner for digital radio, such as HD radio. The accessory can be in communication with a media player such as a portable media device ("PMD").

In various embodiments, the user can be given the ability to command the accessory to provide raw digital data, the ability to scan only for stations having digital audio content (or for all available stations), the ability to provide station lists of stations having digital audio content (or all available stations), and the ability to request and store metadata beyond that for stations actually being listened to provide enhanced search capabilities. Enhanced metadata and searching can provide the listener the ability to refine station choices without having to listen at length to any particular station, and further can facilitate tagging broadcast tracks for subsequent access and/or purchase.

In any of the various embodiments, the digital radio program service can be a program service having digital audio and metadata encoded and modulated according to In-Band/On-Channel Digital Radio Broadcasting Standard NRSC-5 or NRSC-5A. Further, in any of the various embodiments, the station frequencies can be in the FM band, the AM band, or any other band of frequencies.

In one embodiment, a method for use in an accessory having a radio receiver includes: in response to a command specifying a given digital radio program service, tuning to a frequency corresponding to the given digital radio program service; extracting digital information for the given digital radio program service; separating the digital information into audio information and other information; providing the audio information at a first interface of the accessory; and providing the other information in raw digital form at a second interface of the accessory. The first and second interfaces can be provided by separate signaling paths, or by a common signaling path with the audio information multiplexed with the other information onto the common signaling path.

The other information can include metadata associated with the audio information. In some embodiments, the first interface is a digital interface and the accessory provides the audio information to the first interface in digital form. In other embodiments, the accessory converts the audio information to an analog audio format before providing the audio information to the first interface. The first interface can be an analog audio out interface of the accessory that is distinct from the second interface. The audio out interface can be complementary with and communicably coupled to an analog audio interface on a media player.

In some embodiments, the accessory has a media player interface configured for communicable coupling to a complementary accessory interface on a media player. The accessory's audio out interface can be distinct from the accessory's media player interface and can be configured to communicate with an audio output device.

In another embodiment, a method for use in an accessory having a radio receiver includes: receiving a raw-mode command from a media player communicably coupled to the accessory, the raw-mode command specifying that the accessory should provide raw data to the media player. The accessory responds to the raw-mode command by assembling a data record from received digital radio data and sending the assembled data record to the media player using a data transmission command.

In some embodiments, the accessory is also configured to receive a parsed-mode command, and responds to the parsed mode command by assembling data from received digital radio data, parsing the data, assembling a data record from parsed digital radio data, and sending the assembled data record to the media player using a data transmission command.

In another embodiment, a method for use in an accessory having a radio receiver includes: in response to a command at an input interface to tune to a given frequency, tuning to the given frequency; determining the number of digital radio program services at the given frequency; and providing at an output interface information representative of the number of digital radio program services at the given frequency.

In some embodiments, the command at the input interface is provided by a media player. The media player, upon receiving the information representative of the number of digital radio program services at the given frequency, can then command the accessory to provide information regarding each of the digital radio program services. This can be done in a manner where the media player, upon receiving information regarding a given digital radio program service, displays that information without waiting until it has information about all the digital radio program services at the given frequency. Alternatively, it can be done in a manner where the media player, upon receiving information regarding a given digital radio program service, displays that information only after it has information about all the digital radio program services at the given frequency.

In another embodiment, a method for use by a media player communicating with an accessory having a radio receiver includes: requesting information from the accessory regarding digital radio program services at one or more station frequencies; receiving metadata from the accessory regarding multiple digital radio program services; storing the metadata for the multiple digital radio program services independently of receiving audio associated with any particular digital radio program service.

In another embodiment, a method for use in an accessory having a radio receiver includes: tuning to a frequency at which one or more digital radio program services are available; providing information about the one or more digital radio program services to a media player interface; receiving a selection from the media player interface, the selection selecting one of the one or more digital radio program services; and delivering audio content from the selected digital radio program service to the media player interface. In some embodiments, the information about the one or more digital radio program services is provided in raw form; in others, it is services is provided in parsed form.

In another embodiment, a method for use in an accessory having a radio receiver includes: receiving a mode command specifying that the accessory should operate in either a first mode in which only radio stations providing digital audio content are of interest or a second mode in which all radio stations are of interest; receiving a command to search for a receivable radio signal; in the event that the mode command specified that the accessory should operate in the first mode, searching only for a radio signal that includes digital audio content; and in the event that the mode command specified that the accessory should operate in the second mode, searching for any receivable radio signal.

In some embodiments, the mode command is sent as a separate command before the command to search is sent. In other embodiments, the mode command is incorporated into the command to search. In some embodiments, there is a mode where the accessory returns analog stations having tagging information. In some embodiments, there is a mode where the accessory returns analog stations having RDS information.

In another embodiment, a method for use in an accessory having a radio receiver includes: receiving one or more commands to search for all digital radio stations in a given frequency band; and for each digital radio station found, providing station identifying information concerning the found digital radio station at an interface of the accessory.

In some embodiments, the method can also include, after station identifying information has been provided for all found digital radio stations: sequentially tuning to the found stations; and for each found station, providing additional information representing program services available for that found station.

In some embodiments, the method can also include, after station identifying information has been provided for each found digital radio station, providing additional information representing program services available for that found station before searching for the next digital radio station.

In some embodiments, the method can also include, receiving one or more commands to search for all radio stations in the given frequency band, and for each radio station found, providing station identifying information concerning the found radio station at the interface of the accessory.

In another embodiment, an accessory includes: a radio tuner; a first interface; a second interface; and a controller responsive to commands. The controller, in response to a command specifying a given digital radio program service, tunes to a frequency corresponding to the given digital radio program service, extracts digital information for the given digital radio program service, separates the digital information into audio information and other information, provides the audio information at the first interface, and provides the other information in raw digital form at the second interface.

In another embodiment, an accessory includes: a radio tuner, a media player interface; and a controller responsive to commands at the media player interface. The controller, in response to a raw-mode command specifying that the accessory should provide raw data at the media player interface, assembles a data record from received raw digital radio data, and sends the assembled data record to the media player interface using a data transmission command.

In some embodiments, the controller, can also operate in response to a parsed-mode command specifying that the accessory should provide parsed data at the media player interface. In response to such a command, the controller assembles data from received digital radio data, parses the data, assembles a data record from parsed digital radio data, and sends the assembled data record to the media player interface using a data transmission command.

In another embodiment, an accessory includes: a radio tuner; an output interface; and a controller responsive to commands. The controller, in response to one or more commands specifying tuning to a frequency having digital radio programming, tunes to a given frequency having digital radio programming. The controller then determines the number of digital radio program services at the given frequency, and provides at the output interface information representative of the number of digital radio program services at the given frequency.

In another embodiment, an accessory includes: a radio tuner; a media player interface; and a controller responsive to commands at the media player interface. The controller, in response to a set of one or more commands, tunes to a frequency at which one or more digital radio program services are available, and provides information about the one or more digital radio program services at the media player interface. Additionally, the controller, in response to a command specifying one of the one or more digital radio program services, delivers audio content from the selected digital radio program service to the media player interface.

In another embodiment, an accessory includes: a radio tuner; a media player interface; and a controller responsive to commands at the media player interface. The controller, in response to a mode command specifying that the accessory should operate in either a first mode in which only radio stations providing digital audio content are of interest or a second mode in which all radio stations are of interest, sets the accessory in the mode specified by the command. The controller, in response to a command to search for a receivable radio signal: in the event that the accessory in the first mode, searches only for a radio signal that includes digital audio content; and in the event that the accessory is in the second mode, searches for any receivable radio signal.

In some embodiments, the mode command is sent as a separate command before the command to search is sent. In other embodiments, the mode command is incorporated into the command to search. In some embodiments, there is a mode where the accessory returns analog stations having tagging information. In some embodiments, there is a mode where the accessory returns analog stations having RDS information.

In another embodiment, an accessory includes: a radio tuner; a media player interface; and a controller responsive to commands at the media player interface. The controller, in response to one or more commands to search for all digital radio stations in a given frequency band, provides, for each digital radio station found, station identifying information concerning the found digital radio station at the media player interface. In some embodiments, the one or more commands include multiple separate commands to search for the next digital radio station in a scan sequence. In other embodiments, the one or more commands include a single command to search for all the digital radio stations in a scan sequence.

In other embodiments, a computer-readable medium contains program instructions, which when executed by a computer system in an accessory having a radio receiver or a portable device cause the computer system to control the accessory, or the media player as the case may be, to execute a method, which can be one of the methods described above in connection with other embodiments.

As used herein, "issuing a command" or "responding to a command" is to be interpreted broadly to include any signaling regime where a signal specifying an action is sent or received. The signal can be received and interpreted by hardware (e.g., combinatorial logic), software executing on a processor, or a combination of hardware and software.

Additionally, issuing and responding to a command is to be interpreted broadly to include engaging in an exchange of commands. For example, in a particular implementation, a PMD can request information from an accessory regarding all the digital radio program services for a given station by first issuing a command for the accessory to provide the number of digital radio program services, receiving a command specifying that number, and then issuing a command to be notified when information regarding the program services is available. The requested information can then be acquired after further commands for particular information in response to commands specifying that such information is available. Thus, while the term "command" is sometimes used for a low-level atomic transaction, it can also be used to refer to high-level operations that include multiple low-level commands.

A further understanding of the nature and advantages of embodiments may be realized by reference to the remaining portions of the specification and the drawings.

DESCRIPTION OF SPECIFIC EMBODIMENTS

Figure 1:
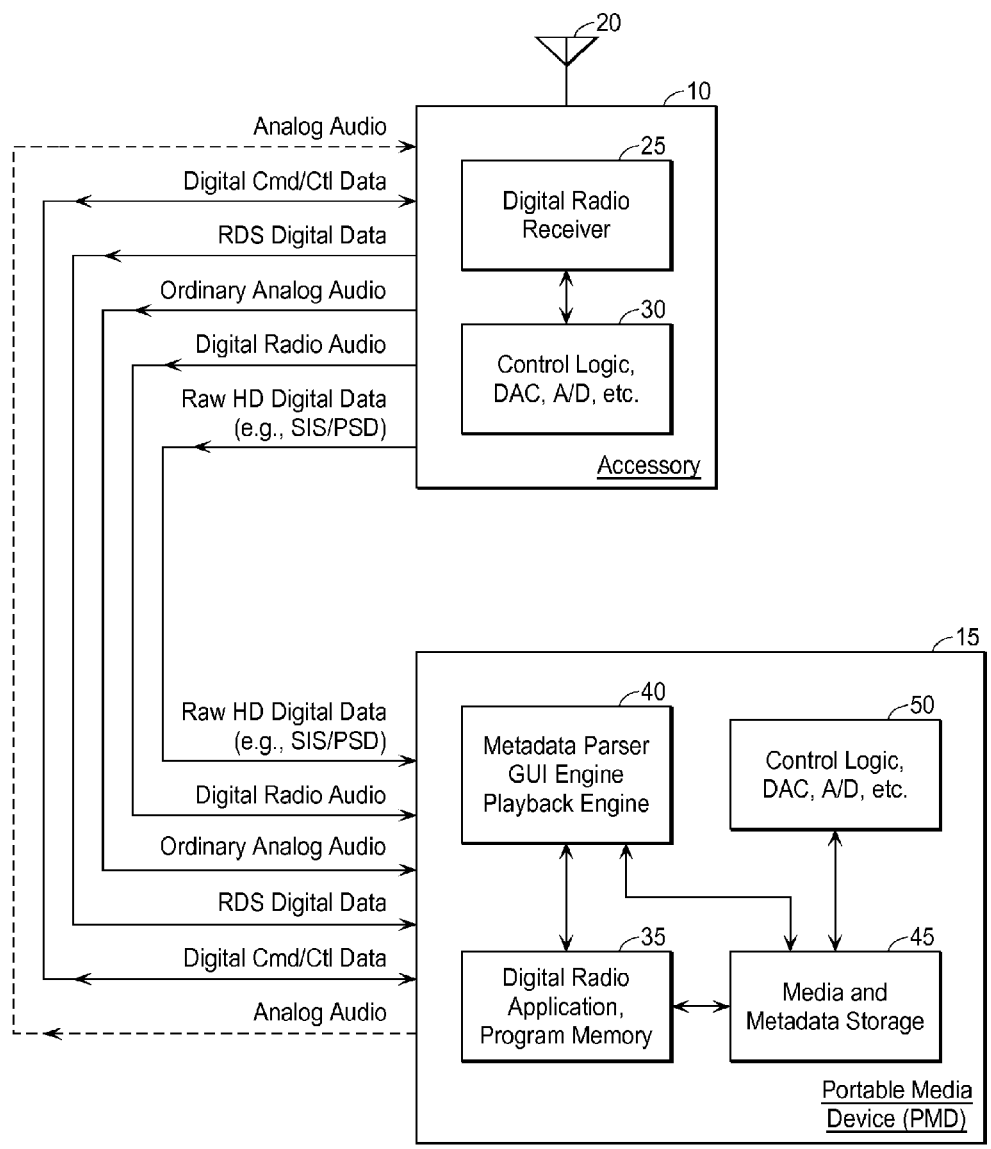
FIG. 1 is a block diagram of a digital radio tuner accessory and a portable media device ("PMD") showing representative signals communicated between them according to an embodiment.

Media assets, such as audio tracks, video tracks, or images (e.g., photos) can be stored, displayed, and/or played on a portable media device ("PMD") or on a host computer executing a media management application ("MMA"). Often, a portable media device acquires its media assets from a host computer executing an MMA, and the user may use the MMA to organize the collection of media assets. One example of a PMD can be the iPod® portable media device, currently available from Apple Inc. of Cupertino, Calif. One example of an MMA can be the iTunes® media management application, produced by Apple Inc. Some PMDs provide the user a display to aid in interacting with the content on the PMD. Indeed, Apple's iPod Touch® PMD and iPhone® phone/PMD are examples where the primary user interface is a touchscreen display.

Media players like Apple's iPod® can communicate with accessories via wired or wireless connections, for example by using a serial protocol when they connect. A standard interface provided by Apple is referred to as the iPod® Accessory Protocol (iAP). The protocol includes a core protocol functionality and one or more accessory lingoes, including for example a display remote lingo, an RF tuner lingo, and an extended interface lingo.

Media assets (sometimes referred to simply as assets) can include any type of media content that can be stored in digital form and experienced by a user. Examples include songs, podcasts, audiobooks, video clips, movies, recorded television or radio broadcasts, photographs, slide shows, other still images, and so on. Where the media assets include music, the individual items are sometimes referred to as "tracks" and certain pre-defined collections of tracks are sometimes referred to as "albums." User-defined collections of tracks are sometimes referred to as "playlists."

Media assets sometimes have associated metadata. Metadata can include any data descriptive of one or more characteristics of that asset. For instance, metadata may include inherent attributes of the asset as well as attributes taken on during the time after the asset is first stored in the PMD. Again, in the context of music tracks and albums, examples of inherent (although possibly changeable by the user) metadata for an asset stored in the PMD can include media type (e.g., music, video, photo, audiobook, podcast, etc.), track ID, track number, track count, track name, artist, album, genre and sub genre classification, digital encoding information (encoding algorithm, bit rate, sample rate), size, total time, date modified, date added, persistent ID, track type, file type, file creator, location.

Some of the metadata may have been generated at the time of encoding the media asset itself and may be stored in the media asset file and made available for asset management applications. Examples of metadata that can be specified by the user, or automatically created and updated based on user actions include user-supplied rating, playlist(s) to which the user has assigned the asset, play count, play date, play date UTC.

Users can acquire media assets for use by an MMA in a number of ways. They can digitize and import analog versions from tapes or phonograph records they own, they can import digital versions from CDs they own, or they can purchase digital copies from on-line sources of already encoded media assets. Apple Inc. maintains the iTunes® Store that allows customers to download audio tracks and albums as well as other media assets. To the extent that it is fair use under appropriate copyright laws, users can also import audio and video obtained through cable, satellite, and over-the-air broadcast sources.

Embodiments provide methods and apparatus for the operation of a digital radio accessory and its communication with a media player. The accessory can be based on any digital radio technology that provides digital metadata (data that is transmitted along with the program audio and that is intended to describe or complement the audio program heard by the listener). Some specific embodiments are based on the IBOC Digital Radio Broadcasting Standard NRSC-5 or NRSC-5A, which is sometimes referred to as HD radio. However, the teachings of embodiments using HD radio are not limited to that environment.

Furthermore, while one possible application contemplates a small accessory connected to a portable media player ("PMD"), with headphones connected to the PMD or accessory, other environments, such as integration with automobile sound systems or other audio systems are contemplated. For definiteness, much of the description will be in terms of a PMD, but as mentioned above, the accessory can communicate with other types of devices.

FIG. 1 is a block diagram of a digital radio tuner accessory 10 and a PMD 15 showing representative signals communicated between them according to an embodiment. Signals can be communicated between the PMD and the accessory using any desired wired and/or wireless communications protocol or set of protocols. Wired connections can be connector-to-connector or using intervening cables. The figure shows six signal communication paths. They can be separate paths or various subsets can be multiplexed onto a common path. Different embodiments can have fewer or more signal paths. In some embodiments, the set of communication paths can be provided by a multi-pin connector. In some embodiments, some signals can have dedicated pins and others can share one or more pins.

The main functionality of accessory 10 is to receive AM and/or FM radio signals from an antenna or cable (an antenna 20 is shown), and to provide digital radio programming (if present) to the listener. As is well known, a single FM station (characterized in the U.S. by a 200-KHz band) may carry a number of digital radio program services, where each digital radio program service can include audio and data. The digital radio program services can be in addition to or instead of what would normally be thought of as regular analog audio (i.e., the signals that can be received by a conventional AM or FM receiver).

As can be seen in FIG. 1, accessory 10 includes two blocks, a digital radio receiver 25 and an accessory control block 30 labeled "Control Logic, DAC, A/D, etc." The label is representative, and in different embodiments, this block could include one or more controllers, processors, memory and other storage elements, discrete logic, and the like. While the presence of an A/D converter is inherent in implementations where an analog signal is being demodulated and digitally sampled, the digital-to-analog converter ("DAC") is optional. Its use will be discussed below.

In some particular implementations, accessory 10 converts the digital radio audio signal to analog format and sends it as an analog signal to PMD 15. In some embodiments, the accessory provides the metadata as raw digital data, not parsed digital data; in these embodiments, it is the responsibility of the PMD to parse the metadata. Examples of metadata include Station Information Service ("SIS") and Program Service Data ("PSD") for embodiments based on IBOC Digital Radio Broadcasting Standard NRSC-5 or NRSC-5A.

When the accessory is tuned to an FM station where the desired digital program service is not available, or the digital signal is of very poor quality, and where the station includes analog programming, the accessory can provide that ordinary analog audio to the PMD. This can be on the same path over which the accessory is currently unable to provide digital radio audio. To the extent that the ordinary FM broadcast includes RDS digital data, the accessory can provide that as well.

FIG. 1 also shows a bidirectional digital command and control data line between the accessory and the PMD. In a specific implementation, where the PMD is an iPod®, the PMD and the accessory communicate using the iPod® Accessory Protocol (iAP), but other embodiments can use other communications protocols. In embodiments, the PMD and the accessory exchange commands belonging to one or more accessory lingoes, but the use of accessory lingoes is not limited to embodiments using iAP. In specific embodiments, the lingoes include an RF tuner lingo, extended to support digital radio (and in particular HD radio) as will be discussed in detail below.

Further, shown as a dashed line from the PMD to the accessory, is an analog audio loop-back. As will be discussed below, in some implementations, the accessory has an audio out connector and can play back received audio, either directly out of the accessory, or in the case of audio loop-back, analog audio that has been conditioned or manipulated and sent back by the PMD.

As can be seen in FIG. 1, PMD 15 includes four blocks, a digital radio application and associated program memory 35, a block 40 shown as including a metadata parser, a GUI engine, and a playback engine, media and metadata storage 45, and a PMD control block 50 labeled "Control Logic, DAC, A/D, etc." In at least some embodiments, the PMD is processor-based, with various features implemented in software. The digital radio application can be one of many applications stored in and run by one or more processors in the PMD.

Embodiments make the digital radio application available to the user, e.g., through selection of a "radio" menu item, only when a digital radio tuner accessory is connected. In other embodiments, the digital radio application can be made available at all times for radio metadata management. Depending on the digital radio application and user preferences, selection of the "radio" menu item can change the music source to radio broadcasts.

In specific embodiments, an RF Tuner lingo is used to pass control and state information between PMD 15 and accessory 10. Normally the PMD is the master and the accessory responds to commands from the PMD. A representative set of commands allows the PMD to initiate actions such as controlling accessory power, setting the accessory's tuning band and frequency, initiating up or down frequency scans, and the like. The PMD can also store station frequencies and other accessory state information, as will be discussed in detail below.

The playback engine is the primary component responsible for audio and/or visual playback of stored media assets or streamed media. In the context of this application, the playback engine operates to output audio corresponding to the received digital radio programming. While some aspects of the playback engine can be implemented in software, some embodiments use a dedicated playback engine capable of amplification and digital-to-analog conversion.

The GUI engine can interact with user input devices and a display to provide a graphical user interface, allowing a user to control operation of PMD 15. The GUI engine (and the playback engine) can be implemented, for example, in program code (software or firmware) stored in PMD 15 and running on a processor, in hardware, or in combinations of the two.

The metadata parser receives raw digital radio data from the accessory, and provides parsed data to the digital radio application. In some embodiments, the metadata parser also parses RDS data accompanying ordinary analog radio programming. In other embodiments, the accessory parses the RDS data.

The interaction with the accessory is controlled by digital radio application 35, which communicates with one or more of the GUI engine, the playback engine, and the metadata parser. The digital radio application can provide a number of functions, including controlling the tuning and playback of digital and other radio programs, and providing the user with the ability to extract and save digital radio metadata (and possibly also RDS data) for particularly favored content as it is being played. This is referred to as "tagging" as will be described in greater detail below.

Media and metadata storage 45, as the name implies, stores media assets and metadata. For PMD operations other than use with the digital radio accessory, the metadata can be directly associated with the stored media assets, as for example in an iTunes® library maintained by the iTunes® MMA. In the context of operation with the digital radio accessory, the media and metadata storage can also store digital radio metadata (and/or RDS data). Also, as will be discussed below, incoming radio audio may become part of the stored media assets, at least temporarily. Digital radio application 35 also interacts with the stored media assets and metadata.

Figure 2:
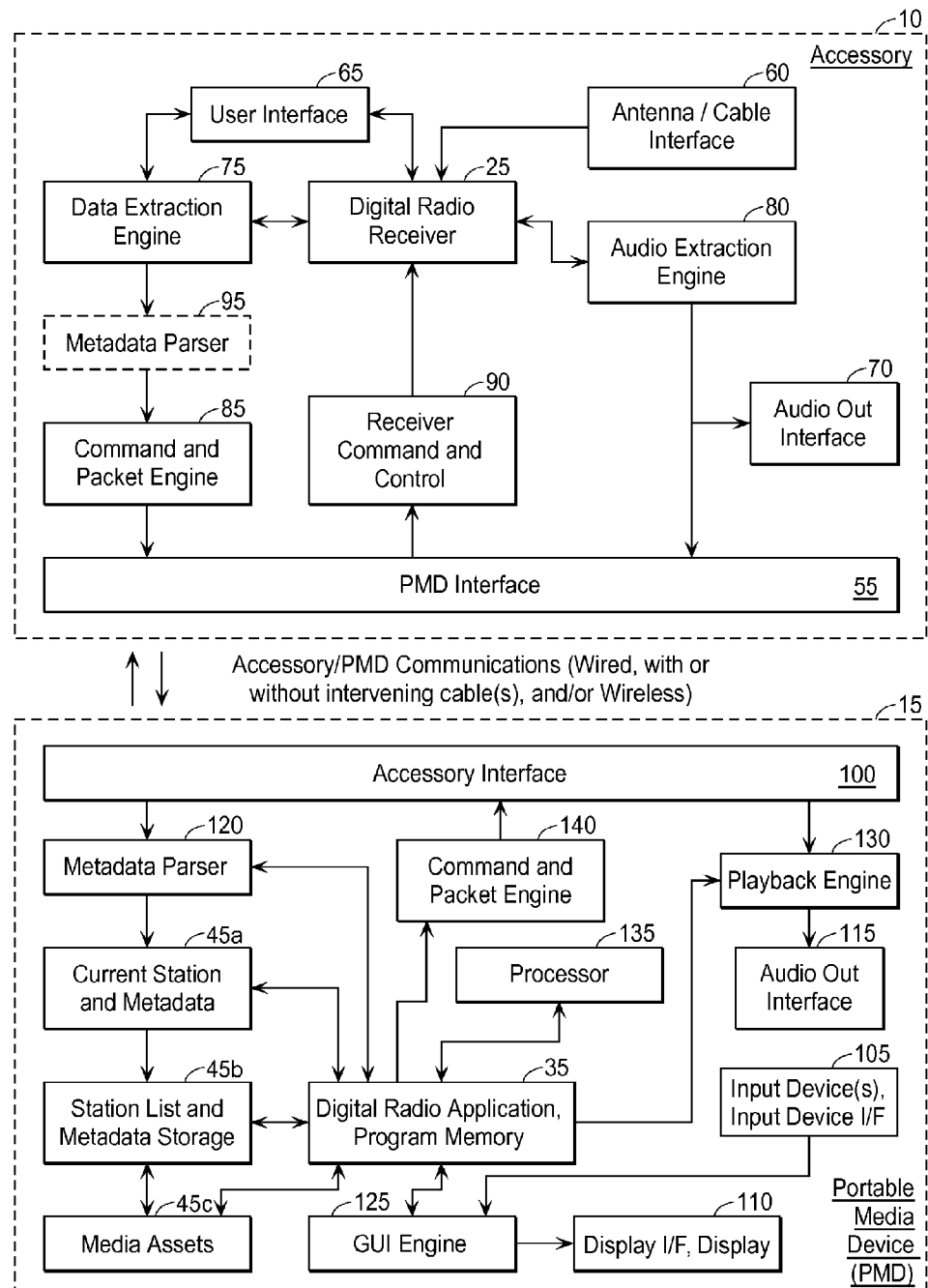
FIG. 2 is a block diagram of a digital radio tuner accessory and a PMD showing possible additional details of some of the elements shown in FIG. 1.

FIG. 2 is a block diagram of digital radio tuner accessory 10 and PMD 15 showing possible additional details of some of the elements shown in FIG. 1. The figure shows a number of signal paths connecting the different elements in the accessory and the PMD, but these are merely representative. For example, the particular connections and their indicated directions are presented to facilitate describing specific transactions and relations. There may be fewer or more connections, and their directionality may differ in specific implementations. Furthermore, while the connections are shown as point to point (i.e., private buses), some embodiments can benefit by the use of common buses to connect various of the elements.

Accessory 10 has at least a PMD interface 55 and an antenna/cable interface 60. Additionally the accessory can have a user interface 65 and/or an audio out interface 70 that is separate from the PMD interface. The accessory's digital radio receiver 25 has an associated data extraction engine 75 and an audio extraction engine 80.

The data extraction engine output is passed to a command and packet engine 85, which formats the metadata and sends it to PMD interface 55. As mentioned above, the communication can be by way of commands using the RF tuner lingo, extended to support digital radio such as HD radio. As shown, the output from the audio extraction engine is also provided to the PMD interface. Commands from the PMD to the receiver and other control signals from the PMD are received at the PMD interface by receiver command and control logic 90, and provided to the digital radio receiver.

Also shown in phantom is an optional metadata parser 95. As mentioned above, some embodiments have the accessory send raw digital radio data to the PMD, but if a parser is provided, it is the parser's output rather than the data extraction engine's output that is sent to PMD interface 55. Optional user interface 65, if provided, can include, for example, a display, or buttons or other input elements to control the accessory or the PMD.

There are at least two possibilities as to how the accessory's separate audio out interface 70 can be used. One possibility, alluded to above, is that the audio extraction engine sends the digital radio audio (in digital form or as having been converted to analog form) to PMD interface 55. It is thus communicated to the PMD, which then performs some conditioning or manipulation on the digital radio audio before sending it back to the accessory for output. Alternatively, the accessory can send the digital radio audio (after converting it to analog form) directly to audio out interface 70 for possible connection to headphones or a speaker system.

As mentioned above, in some embodiments, it is preferred to have the accessory decode the digital audio signal and convert it to analog form. This relieves the PMD of having to do this task. In embodiments where it is digital, not analog, audio that is sent to the PMD, the PMD can do the decoding and digital-to-analog conversion and send it back to the accessory for playback. In some embodiments, the digital radio audio is only provided to the accessory's audio out interface and is not sent to the PMD.

A processor and storage are not shown explicitly, but one or more of the data extraction engine, the digital radio receiver, the audio extraction engine, the metadata parser (if provided), the command and packet engine, and the receiver command and control can have associated storage, and one or more can be processor-based. That is, some of the processes can be implemented in software running on a processor, which can be a conventional microprocessor or microcontroller, while some can be implemented in hardware or a combination of hardware and software. Other embodiments can be implemented with other types of controller circuitry such as combinatorial logic.

As shown in FIG. 2, PMD 15 includes a number of interfaces, including an accessory interface 100, an input device interface 105 with one or more associated input devices, a display interface 110 with an associated display, and an audio out interface 115. Signals are communicated between the accessory's PMD interface 55 and the PMD's accessory interface 100 via any desired communications protocol, which can be wired or wireless, with or without intervening cables. Block 40 of FIG. 1 is broken out as a metadata parser 120, a GUI engine 125, and a playback engine 130.

Digital radio application 35 is shown stored in program memory and running on a processor 135, and communicating with metadata parser 120, with GUI engine 125, with playback engine 130, with a command and packet engine 140, and with media and metadata storage 45, which is broken out into three components 45a, 45b, and 45c. The first component 45a is used to store current station information and other metadata representing current program information (e.g., artist, song title). The component block 45b is used to store cumulative radio-related metadata, such as databases relating to additional listened-to stations and program information, as well as metadata associated with non-radio-related stored media assets. The third component 45c is used to store the non-radio-related media assets, and possibly radio-related media assets.

Embodiments can be implemented with many different types of processor. Many PMDs use an embedded processor such as processors using the ARM architecture (a RISC architecture designed by ARM Limited). Digital radio application 35's program memory and media and metadata storage components 45a, 45b, and 45c can be considered elements of a storage subsystem. The storage subsystem can include various types of storage media, and stores the basic programming and data constructs that provide at least some of the functionality of PMD 15. These can include for example, a memory subsystem and a file storage subsystem.

The memory subsystem typically includes a number of memories including a main random access memory (RAM) for storage of instructions and data during program execution and a non-volatile memory (NVM) in which fixed instructions and fixed system parameters are stored. While the non-volatile memory may be a ROM, rewritable non-volatile memories such as flash EPROMs may be used. The file storage subsystem provides persistent (non-volatile) storage for program and data files, and may include one or hard disk drives and/or flash memory drives. Additionally the file storage subsystem may support associated removable media, e.g., flash memory cards such as those used in digital cameras and mobile phones. Possible types of flash memory cards include but are not limited to Secure Digital (SD), CompactFlash (CF), Memory Stick (MS), MultiMediaCard (MMC) xD-Picture Card (xD), and SmartMedia (SM).

Accessory interface 100 can be part of a larger I/O interface, which can include components for communicating with elements other than accessory 10, such as one or more host computers or one or more networks. The I/O interface can include, for example, one or more peripheral interfaces such as USB, IEEE 1394 (Firewire), and Bluetooth (a short-range wireless communication standard developed by the Bluetooth SIG and licensed under the trademark Bluetooth®). The I/O interface may also or alternatively include one or more wired networking interfaces (e.g., Ethernet) or wireless networking interfaces (e.g., Wi-Fi adhering to one of the 802.11 family standards, digital mobile phone technologies). In some embodiments (possibly the same as those above, but possibly different embodiments) the I/O interface can have the ability to couple PMD 15 with a source of media assets (e.g., via a wireless connection to the Internet) so that the PMD can obtain media assets without connecting to a host computer.

During operation, control of the accessory is effected by activating command and packet engine 140, which formats suitable commands and sends them to accessory interface 100. Incoming raw digital radio metadata (or raw RDS metadata) is processed by metadata parser 120, which extracts at least the current station and possibly additional metadata regarding the program that is playing. The PMD can include, as a part of the digital radio application, station list and meta data storage so that the user can select previously encountered stations. In a particular implementation, the digital radio audio is provided as analog audio, and is communicated to the playback engine, being output on audio out interface 115. External speakers, a set of headphones, or the like can be connected to the audio out interface.

Playback engine 130 can be of conventional design. In some embodiments, the playback engine can provide USB digital audio as well as analog audio. A typical architecture can include a decoder, a multiplier, a digital-to-analog converter ("D/A converter" or "DAC"), and a preamplifier. The decoder and multiplier can be implemented in hardware or software, while the DAC and preamplifier are by nature hardware elements. A conventional decoder is designed to decode audio files or streams in formats such as MP3 and AAC. If the accessory receives the digital radio audio in digital format, playback engine 130, or some other entity on the accessory, operates to decode the digital radio audio.

GUI engine 125 can interact with the display that is coupled to display interface 110, and with the user input device or devices that are coupled to user input device interface 105 to provide a graphical user interface, allowing a user to control operation of PMD 15. GUI engine 125 can control the display to present user interface elements such as text menus, icons or the like, and user input devices can be operated by a user to interact with the displayed user interface elements (e.g., selecting or activating an element, thereby giving an instruction to the PMD).

The user input devices can include such elements as scroll wheels, buttons, keyboards; pointing devices such as mice, trackballs, touchpads, or graphics tablets; scanners, barcode scanners; touchscreens incorporated into displays; audio input devices such as voice recognition systems, microphones, and other types of input devices. In general, use of the term "user input device" is intended to include all possible types of devices and ways for a user to input information into PMD 15. Additional types of input devices could be motion detectors such as accelerometers that can respond to a user's actually moving the device. In the case of a portable device, for example, a clockwise (or counterclockwise) twist of the wrist can be interpreted in a manner analogous to a clockwise (or counterclockwise) actuation of a scroll wheel or a knob.

Digital radio programming provides two main aspects, either or both of which can be important to the listener. The digital audio channel can provide enhanced audio quality (possibly near-CD-quality from some digital radio FM broadcasts). The digital radio metadata channel can provide enhanced program management and selection capabilities. For example, when a listener particularly likes a track or a program, knowing the artist or the song title facilitates the user's obtaining access to that song or other songs by that artist in the future.

Further, since the digital radio metadata is available to the PMD, the user can activate a control on the PMD or the accessory and "tag" the program content, that is, capture the metadata associated with that track. The user can then easily search on-line content providers, and purchase the content from a provider having that content.

Depending on the digital radio application and the user's preferences, the amount of digital radio metadata stored in media and metadata storage 45 can be allowed to include all the digital radio metadata that is acquired while the accessory is in use, possibly limited only by storage capability. Alternatively, it can be limited in various ways, for example, to metadata that is stored in response to an explicit tagging request, or to metadata for each station corresponding to the last N tracks (e.g. N=20) received while the user was listening to that station.

This gives the user the ability to search the metadata later. As an additional function, in some embodiments, the digital radio application can record the incoming digital radio audio. This can be of benefit if the user is not sure what tracks to tag at the time of listening to them, but decides later to tag metadata for subsequent acquisition. To support this functionality, the digital radio application can limit the data storage requirements by recording each track at low fidelity, or only for a short period of the track's duration. This would still give the user a thumbnail sketch or preview of the track.

U.S. patent application Ser. No. 11/961,904, filed Dec. 20, 2007 for "Communicating and Storing Information Associated with Media Broadcasts" (inventors Jesse Lee Dorogusker et al.) describes how a PMD and/or an accessory coupled thereto can be used to collect and store information about broadcast content received by the PMD and/or accessory. The collected information, referred to as a "tag," can encompass any type of data that facilitates identification of a particular broadcast track (e.g., a song in the case of music broadcasts, a podcast, an episode of a TV program, or the like). The entire disclosure of U.S. patent application Ser. No. 11/961,904 is incorporated by reference.

Figure 3A:
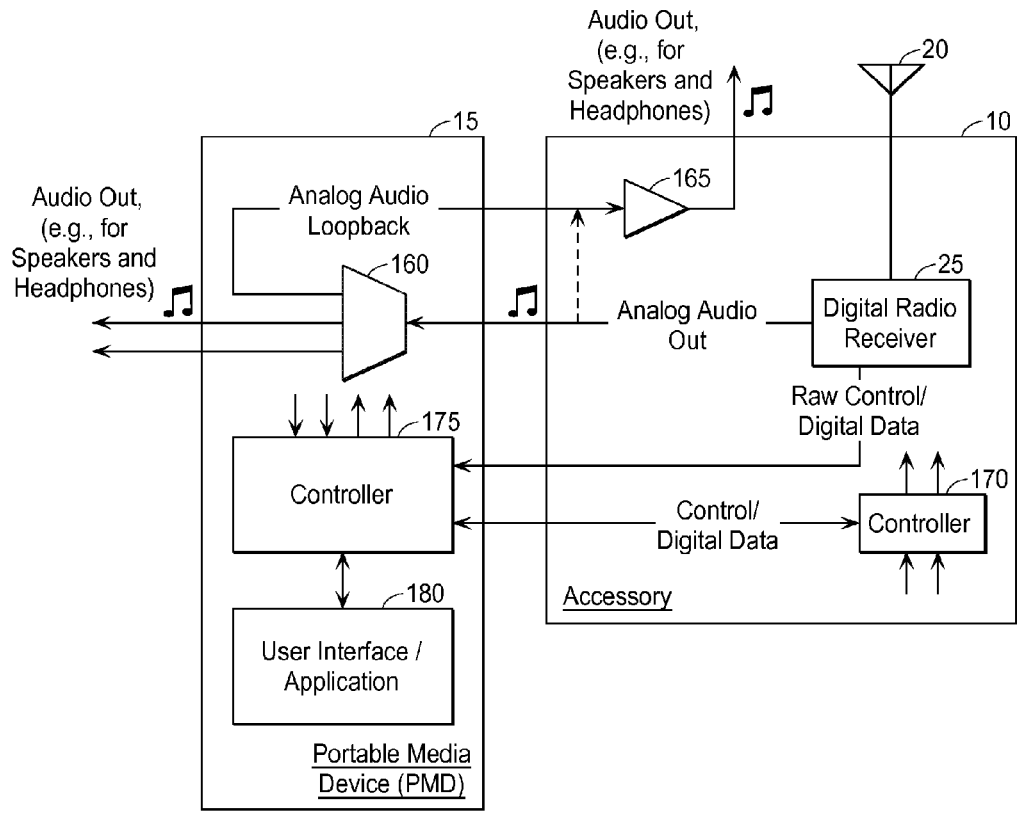
FIG. 3A is a block diagram of a digital radio tuner accessory and a PMD showing possible audio paths that can be present in accessories and PMDs such as those shown in FIG. 1 or FIG. 2.
Figure 3B:
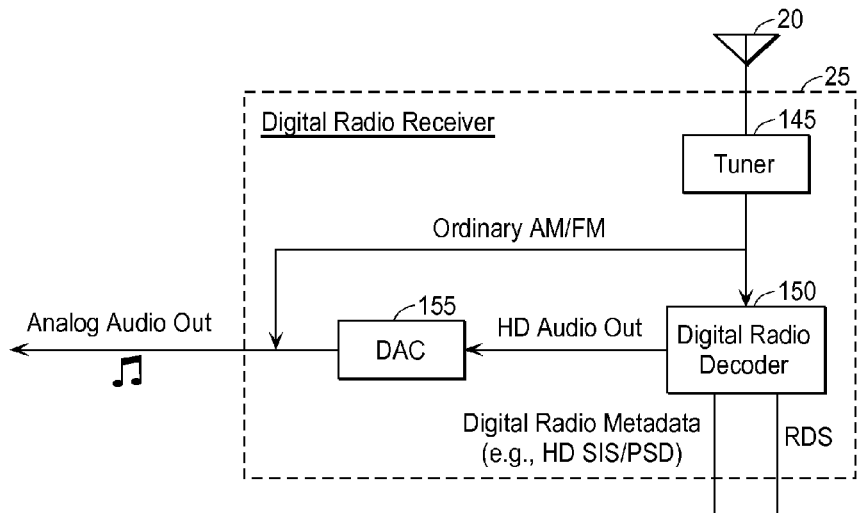
FIG. 3B is a block diagram showing additional details of the digital radio receiver shown in FIG. 3A.

FIG. 3A is a block diagram of a digital radio tuner accessory 10 and a PMD 15 showing possible audio paths that can be present in accessories and PMDs such as those shown in FIG. 1 or FIG. 2. FIG. 3B is a block diagram showing additional details of the digital radio receiver 25 shown in FIG. 3A. In this particular implementation, the accessory converts the audio from the digital radio broadcast to analog form before sending it to the PMD. As shown in FIG. 3B, the digital radio receiver includes a tuner 145 and a digital radio decoder 150. Elements corresponding generally to data extraction engine 75 and audio extraction engine 80 are not explicitly shown.

Digital radio decoder 150 provides raw digital metadata, as well as digital audio. The digital radio decoder can also provide RDS data for ordinary analog stations that support RDS. For specific embodiments based on IBOC Digital Radio Broadcasting Standard NRSC-5 or NRSC-5A, the metadata includes SIS and PSD.

The decoded digital audio is communicated to a DAC 155, which converts the digital audio to analog audio, which is communicated to accessory 10 through the PMD and accessory interfaces shown in FIG. 2. The analog audio signal is split by an audio demultiplexer 160, with the different outputs possibly subjected to different amplification and other conditioning. Two of the outputs are shown as being output from PMD 15 to provide the capability of driving, for example, headphones or external speakers. A third output is shown as being fed back to accessory 10 and separately amplified by an amplifier 165 for output from the accessory, again providing the capability of driving, for example, headphones or external speakers.

The various control and processing elements shown in FIG. 1 and FIG. 2 are only shown at a high level (a controller 170 in accessory 10; a controller 175 and an application/user interface block 180 in PMD 15). FIG. 3A also shows a direct path (drawn in phantom) from digital radio receiver 25 to amplifier 165. This illustrates the possibility that in some embodiments, the analog audio can be output directly from the accessory without being looped back from the PMD. The analog audio can also be sent to the PMD, or not.

As shown in FIG. 3B, digital radio receiver 25 provides a bypass for the analog audio to accommodate the possibility that the station to which tuner 145 is tuned does not provide digital audio, or that the digital audio signal is too weak to be useful. The bypass can be implemented with audio switching elements (not shown) that can be controlled by the digital radio application in the PMD.

The following description covers a particular example of digital radio setup, tuning, and service info/data notification/retrieval. The specific environment is where the digital radio is compliant with the NRSC-5 or NRSC-5A standard, and references are made to HD programs and the like. This is not intended to be limiting since the techniques can be used for other digital radio technologies.

Also, the particular mechanism described for the PMD's ascertaining the accessory's capabilities is for the PMD to interrogate the accessory and for the accessory to send a reply with its capabilities. In other embodiments, the accessory sends the PMD its capabilities when initial communications are established. Similarly, in embodiments, the PMD can provide transaction identifiers for commands that it sends to the accessory, and the accessory provides the transaction identifier when it responds to a particular command. This allows the accessory to respond to commands out-of-order and have the PMD properly account for them.

U.S. patent application Ser. No. 11/479,308, filed Jun. 30, 2006 for "Connector Interface System Facilitating Communication Between a Media Player and Accessories" (inventors Emily C. Schubert et al.), now U.S. Pat. No. 7,293,122 issued Nov. 6, 2007, describes how command lingoes can be used in connection with communications between a PMD and an accessory. The entire disclosure of U.S. patent application Ser. No. 11/479,308 (now U.S. Pat. No. 7,293, 122) is incorporated by reference.

U.S. patent application Ser. No. 11/519,386, filed Sep. 11, 2006 for "Method and System for Controlling an Accessory Having a Tuner" (inventors Lawrence G. Bolton et al.), now U.S. Pat. No. 7,441,058 issued Oct. 21, 2008 describes communications between a PMD and an accessory having an RF tuner. The entire disclosure of U.S. patent application Ser. No. 11/519,386 (now U.S. Pat. No. 7,441,058) is incorporated by reference.

Additional details about the specific commands are set forth below near the end of the description.

Figure 4:
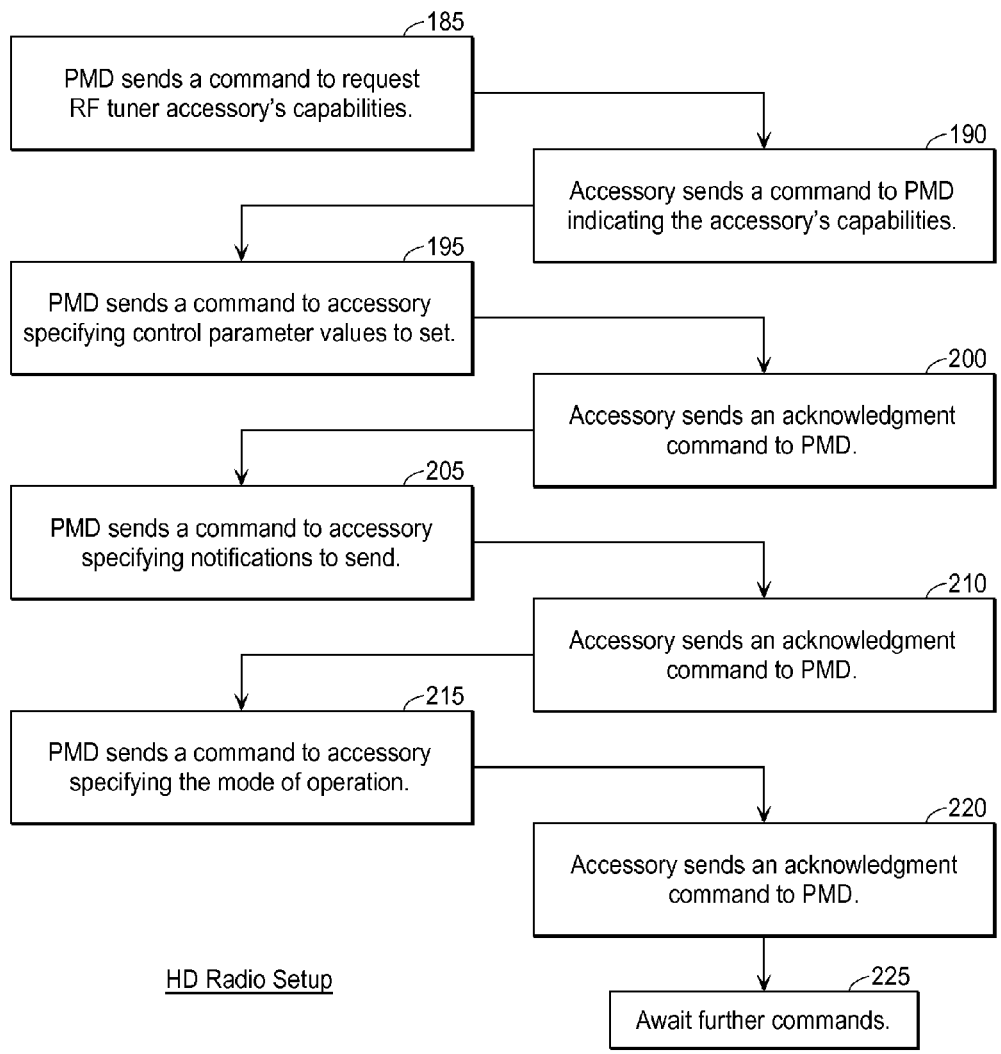
FIG. 4 is a flowchart showing an exemplary exchange of commands between the PMD and the accessory during digital radio setup according to an embodiment.

FIG. 4 is a flowchart showing an exemplary exchange of commands between PMD 15 and accessory 10 during HD radio setup according to an embodiment. It should be understood that this description is in terms of a very specific command set, and other command sets and syntaxes can also be used. In this example, the instructions are based on the RF tuner lingo described above.

At a block 185, the PMD sends a command to the accessory to request the RF tuner's capabilities. At a block 190, the accessory responds to the command by sending a command, which includes data (e.g., a 32-bit data field) indicating the accessory's capabilities. In a specific implementation, the data field can include values such as FM band U.S., HD radio, tuner power control, status change notification, FM resolution 200 kHz, tuner seek capable, tuner seek RSSI threshold capable, force monophonic mode capable, stereo blend capable, FM tuner deemphasis select capable, AM resolution 10 kHz, RDS/RBDS data capable, tuner channel RSSI indication capable, stereo source indicator capable.

At a block 195, the PMD sends a command to the accessory with data specifying the control parameter values to set. For example, the command can include values such as turn power on, status change notification off, raw mode on. At a block 200, the accessory responds to the command by sending an acknowledgment ("ACK") command to the PMD.

At a block 205, the PMD sends a command to the accessory with data specifying notification of a desired type or types of data. For example, the data can specify notification when SIS or PSD raw data is available. At a block 210, the accessory responds to the command by sending an ACK command. At a block 215, the PMD sends a command to the accessory with data specifying parameter values for a desired mode of operation. For example, the command can include values such as FM tuner resolution 200 kHz, stereo allowed, no stereo blend, FM tuner deemphasis 75 µs, AM tuner resolution 10 kHz. At a block 220, the accessory responds to the command by sending an ACK command to the PMD. At this point, the accessory has been configured and awaits further commands (block 225).

Figure 5:
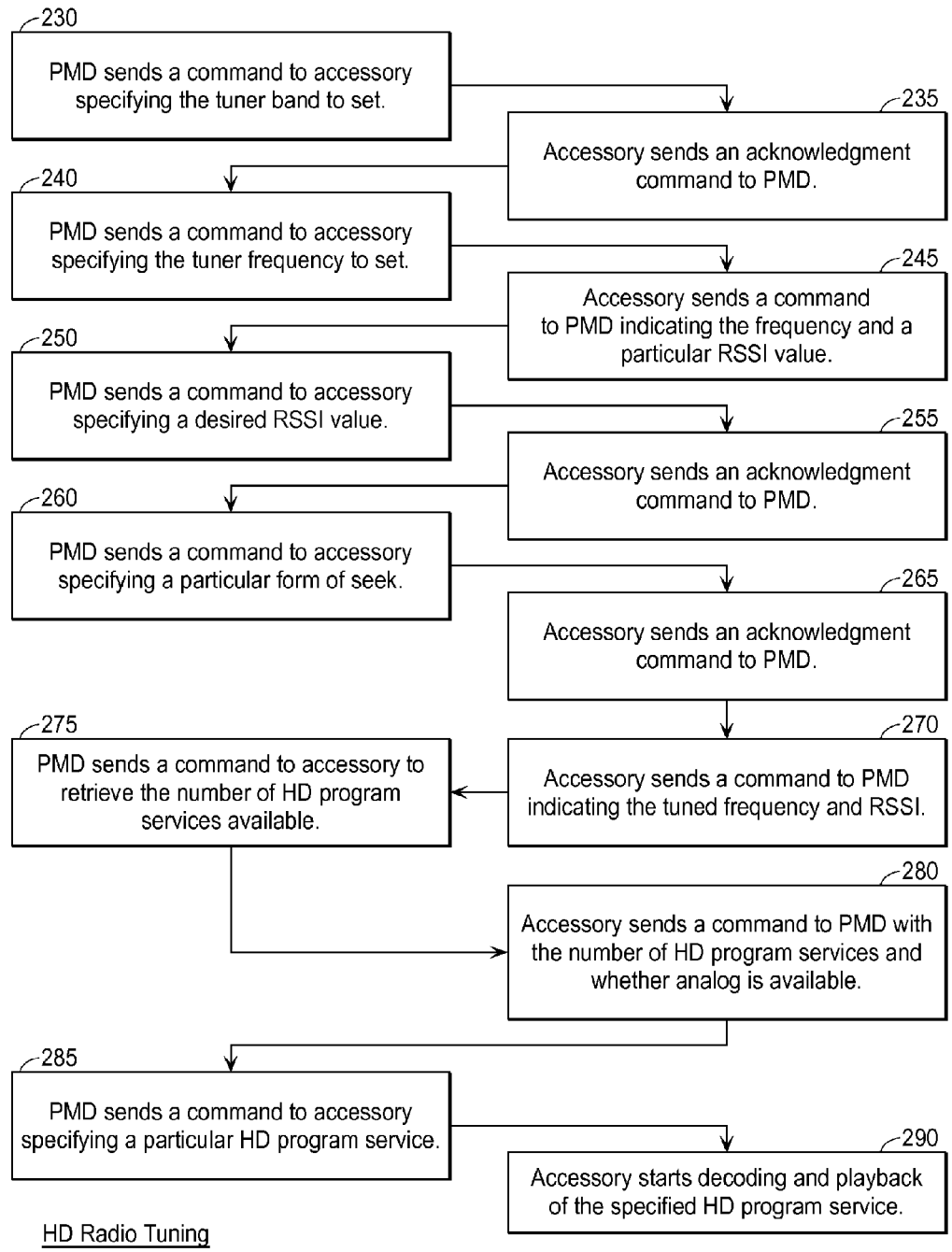
FIG. 5 is a flowchart showing an exemplary exchange of commands between the PMD and the accessory during digital radio tuning according to an embodiment.

FIG. 5 is a flowchart showing an exemplary exchange of commands between PMD 15 and accessory 10 during HD radio tuning according to an embodiment. At a block 230, the PMD sends a command to the accessory with data specifying the tuner band to set. For example, the data can include a parameter value specifying tuning to the FM U.S. band. At a block 235, the accessory responds to the command by sending an ACK command to the PMD.

At a block 240, the PMD sends a command to the accessory with data specifying the frequency to be tuned. For example, the data can specify tuning to 97.7 MHz. At a block 245, the accessory responds to the command by sending a command to the PMD with data specifying the frequency and a particular RSSI threshold level. For example, the accessory can return 97.7 MHz with an RSSI level of 31.

At a block 250, the PMD sends a command to the accessory with data specifying a desired RSSI threshold value, for example 8. At a block 255, the accessory responds to the command by sending an ACK command to the PMD. At a block 260, the PMD sends a command to the accessory with data specifying the type of seek to start. For example, the command can specify starting the tuner seek up from current frequency while checking for RSSI threshold.

In a particular implementation, the command specifying the type of seek to start can specify seeking in any of the following sixteen ways (eight ways, each either with or without using an RSSI threshold):

Seek up from beginning of band using or not using an RSSI threshold.

Seek down from end of band using or not using an RSSI threshold.

Seek up from current frequency using or not using an RSSI threshold.

Seek down from current frequency using or not using an RSSI threshold.

Seek up from beginning of band for an HD signal using or not using an RSSI threshold.

Seek down from end of band for an HD signal using or not using an RSSI threshold.

Seek up from current frequency for an HD signal using or not using an RSSI threshold.

Seek down from current frequency for an HD signal using or not using an RSSI threshold.

In the particular implementation, a seek operation using an RSSI threshold completes when either of two conditions is satisfied:

A channel was located within the band that satisfies the minimum RSSI threshold level.

No channel was located within the band that satisfies the minimum the RSSI threshold level. The seek has traversed the entire band and wrapped back to the beginning tuner frequency without locating a valid channel. If no channel is found, it may indicate that the threshold is too high for the current radio reception area.

In the particular implementation, a seek operation not using RSSI threshold completes when either of two conditions is satisfied:

A channel was located within the band that satisfies the criteria of the tuner's seek function. This may result in moving one or more channel spacings and wrapping around at the band ends.

No channel was located within the band that satisfies the criteria of the tuner's seek function and the seek has traversed the entire band and wrapped back to the beginning tuner frequency without locating a valid channel.

In the particular implementation, an HD seek operation skips non-HD channels and stops only on channels with HD signals present. The seek completes when either of two conditions is satisfied:

An HD channel was located within the band that satisfies the criteria of the tuner's seek function. This may result in moving one or more channel spacings and wrapping around at the band ends.

No HD channel was located within the band that satisfies the criteria of the tuner's seek function and the seek has traversed the entire band and wrapped back to the beginning tuner frequency without locating a valid HD channel.

In an alternative implementation, a mode specifying whether subsequent seek operations are to return only radio stations providing digital audio content or return all radio stations. In this alternative implementation, the seek commands can then be structured without separate indications whether only digital audio stations are to be sought.

At a block 265, the accessory responds to the command by sending an ACK command to the PMD. At a block 270, the accessory sends a command to the PMD with data specifying the tuned frequency and RSSI value. For example, the accessory can return 106.9 MHz with an RSSI threshold level of 30.

At a block 275, the PMD sends a command to the accessory to request the number of HD program services available for that frequency. In a particular implementation, the command also requests an indication whether analog programming is also available. At a block 280, the accessory responds to the command by sending a command to the PMD with data specifying the number of HD program services available for that frequency and whether analog programming is available.

At a block 285, the PMD sends a command to the accessory with data specifying a desired program service. At a block 290, the accessory responds to the command by starting decoding and playback of the specified HD program service.

Figure 6:
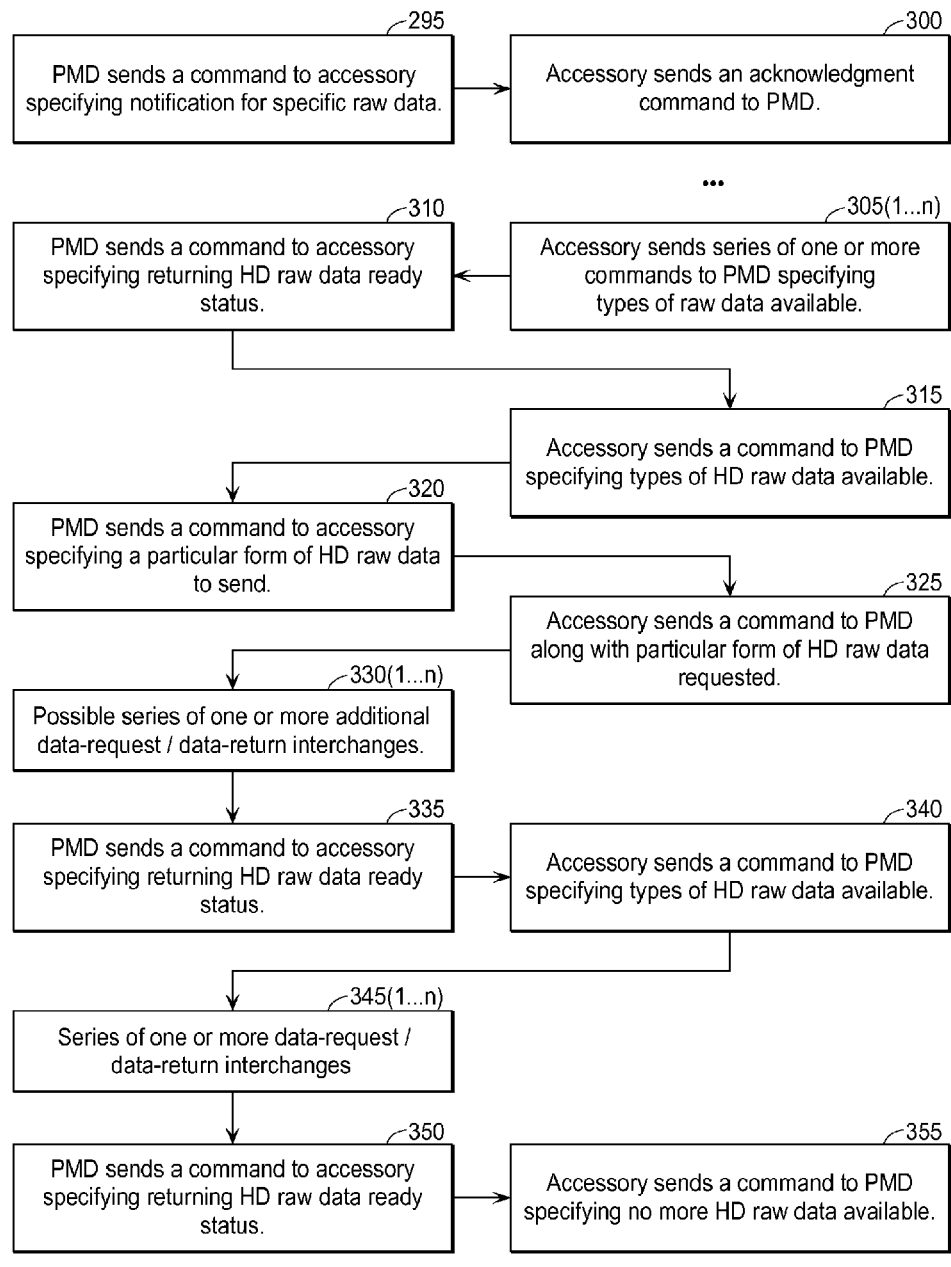
FIG. 6 is a flowchart showing an exemplary exchange of commands between the PMD and the accessory during notification and retrieval of digital radio information and data according to an embodiment.

FIG. 6 is a flowchart showing an exemplary exchange of commands between PMD 15 and accessory 10 during notification and retrieval of HD information and data according to an embodiment. At a block 295, the PMD sends a command to the accessory with data specifying notification for a specific type or types of raw data. At a block 300, the accessory responds to the command by sending an ACK command to the PMD. This sequence of blocks was described above in connection with the HD radio setup shown in FIG. 4. Depending on the circumstances, these blocks can be eliminated if the notifications are known to have already been set.

At a series of blocks 305 (1 . . . n), the accessory sends a series of one or more commands to the PMD with data specifying the types of raw data available. For example, an exemplary series of four notifications can be SIS raw mode data received, PSD raw mode data received for program 1, PSD raw mode data received for program 2, and PSD raw mode data received for program 3.

At a block 310, the PMD sends a command to the accessory specifying returning HD raw data ready status. At a block 315, the accessory responds to the command by sending a command to the PMD with data specifying which types of HD raw data are available. For example, the data can signify that SIS and PSD raw data are available.

At a block 320, the PMD sends a command to the accessory with data specifying a particular form of HD raw data to send. At a block 325, the accessory responds to the command by sending a command to the PMD along with particular form of HD raw data requested. This can be followed by a series of one or more blocks 330 (1 . . . n) where the PMD and the accessory engage in a series of one or more HD data-request/data-return interchanges.

At a block 335, the PMD sends a command to the accessory specifying returning HD raw data ready status. At a block 340, the accessory responds to the command by sending a command to the PMD with data signifying the types of HD raw data available. This can then be followed by a series of one or more blocks 345 (1 . . . n) where the PMD and the accessory engage in a series of one or more HD data-request/data-return interchanges.

At a block 350, the PMD sends a command to the accessory specifying returning HD raw data ready status. At a block 355, the accessory responds to the command by sending a command to the PMD with data signifying which types of HD raw data are available. In the specific illustrated sequence, the data signifies that no more HD raw data is available.

Accessory 10 in cooperation with PMD 15 can be configured to generate station lists so that users can know ahead of time what stations are available for selection. According to embodiments, a user can specify a list of all stations, or a list of all stations having digital programming (i.e., a "digital only" list). A station list can be generated in response to specific commands, or under other conditions that can be set by user preference. For example, a user wishing to listen to the radio can set a preference that generates a station list every time the accessory is turned on. This can be done in a manner that can maintain a further preference that the default station is the last station to which the accessory was tuned.

Embodiments recognize that different users have different reasons for preferring digital radio. One user's preference for digital radio can arise solely out of the desire to listen to digital audio because of its superior quality. On the other hand, another user's preference can arise solely out of the desire for the tagging capability that arises from returned metadata. From this latter user's point of view, an ordinary analog station with RDS capability has the same value as a digital station. Accordingly, in some embodiments, the user can specify a preference for a digital and/or RDS station list.

Figure 7:
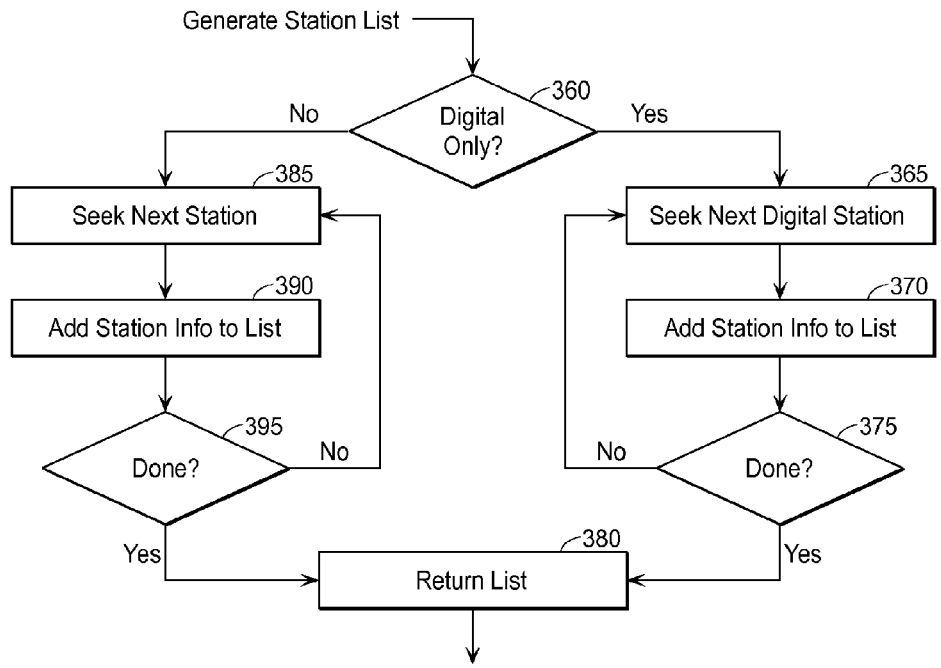
FIG. 7 is a flowchart showing an exemplary method of generating a station list according and embodiment.

FIG. 7 is a flowchart showing an exemplary method of generating a station list according an embodiment. The method provides the user a choice of a digital-only list or an all-inclusive list. The method begins in response to a command to generate a station list. At a test block 360, it is determined whether the station list is to include only digital stations or all stations. In the present context, the definition of "digital station" can depend on a user preference that defines ordinary analog stations with RDS capability as digital for the purpose of this test. Depending on this preference, ordinary analog stations with RDS capability will be included in or excluded from the digital-only test.

If at test block 360 it is determined that the station list is to include digital stations only, the method proceeds down the branch on the right side of the figure. At a block 365, the accessory's tuner seeks the next digital station, and at a block 370, the station is added to the list. At a test block 375, it is determined whether all the stations have been found. This will be true, for example, if the search started at one end of the entire tuning band and the other end of the tuning band is reached. Similarly, this will be true if the search started at a given frequency and the tuner has searched to the end of the band, looped around, and reached the given frequency. If at test block 375, it is determined that all stations have been found, the method branches to a block 380, denoted "Return List." If all the stations have not yet been found, the method loops back to block 365 to seek the next station.

The description above does not explicitly address the determination of what digital programming is available at each digital station, nor does it address the available metadata (digital radio or RDS, if applicable). While some embodiments can provide the specifics of the digital programming at each digital radio station (e.g., by performing methods along the lines of those discussed in connection with FIG. 6), others can leave that determination to be made in response to additional commands after the entire station list has been generated. Whether such information is sent from accessory 10 to PMD 15 as parsed data or raw data is a matter of design choice.

If at test 360 it is determined that the station list is to include all stations, the method proceeds down the branch on the left side of the figure. At a block 385, the accessory's tuner seeks the next station of any type (digital or ordinary analog), and at a block 390, the station is added to the list. At a test block 395, it is determined whether all the stations have been found. This can be accomplished in a manner along the lines of the determination discussed above with respect to test block 375. If at test block 375, it is determined that all stations have been found, the method branches to block 380 ("Return List"). If all the stations have not yet been found, the method loops back to block 385 to seek the next station.

Figures 8A, 8B:
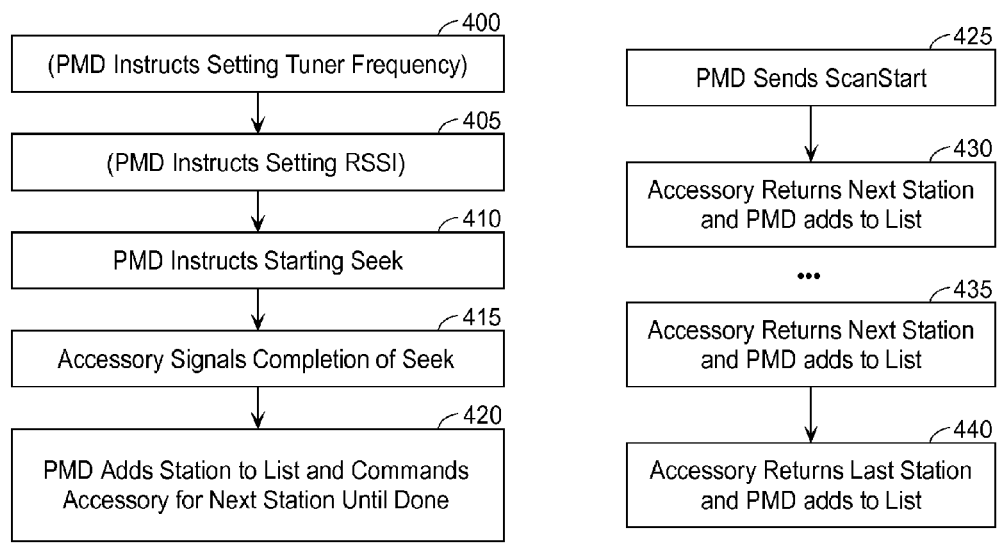
FIG. 8A is a flowchart showing additional details of selected portions of the flowchart of FIG. 7 according to one implementation.
FIG. 8B is a flowchart showing additional details of selected portions of the flowchart of FIG. 7 according to another implementation.

The manner in which the list is built up depends on the implementation. Two implementations will now be described in connection with FIGS. 8A and 8B. FIG. 8A is a flowchart showing additional details of selected portions of the flowchart of FIG. 7 according to one implementation. As discussed above, both branches of the method of generating a station list include blocks of seeking the next station (digital or any, depending on the branch) and adding the station to the station list. The implementation of FIG. 8A can be based on the tuner lingo that includes the commands discussed above.

The flowchart shown in FIG. 8A is simplified in that it does not include ACK commands and the like sent by accessory 10 by PMD 15 in response to commands sent by the PMD. At an optional block 400, the PMD sends a command to the accessory specifying the initial frequency. Then, at an optional block 405, the PMD sends a command specifying an RSSI value for the upcoming seek. At a block 410, the PMD sends a command specifying the particular type of seek. As discussed above, there are 16 options for the command, and the type of seek will depend on which branch of FIG. 7 is being as well as other factors.

At a block 415, the accessory, having found a station meeting the seek criteria, sends a command to the PMD signifying completion of the seek, and further, as discussed above, possibly informing the PMD of the found frequency. At a block 420, the PMD adds the found frequency to the station list, and starts the sequence again until the whole band has been scanned. The commands in blocks 400 and 405 are shown in parentheses, signifying that these blocks can be absent in some embodiments. For example, since the PMD knows that the purpose of the overall operation is to seek stations from one end of the band to another, it is not necessary in some embodiments to specify a starting frequency. However, if the accessory is set to start playing at the last station it was tuned to before being shut down, it can be useful to start the station list scan at that station and end when that station has been reached again.

In some embodiments, the command to start a seek can specify, for example, seeking up from the beginning of the band on the first iteration, and seeking up from the current frequency on subsequent iterations. As discussed above, in some embodiments, a station list that is to include digital stations can also include information regarding all the program services available at a digital station's frequency. For example, this information can be obtained using techniques along the lines shown in FIG. 6 using the command to request the number of HD program services available for that frequency, and further using commands specifying the particular form of HD raw data to send. These blocks are not shown in FIG. 8A.

The PMD can obtain this information in an interleaved manner, i.e., following receipt of each command specifying the tuned frequency and RSSI value with a command requesting the number of HD program services available (not shown) followed by suitable commands (also not shown) specifying the particular form of HD raw data to send. Alternatively, the PMD can obtain the information after the basic station list has been set up. This can be set up as a user preference. Additionally, the amount of information obtained on a given pass can be determined by user preference. A given user can decide that a station list with all the stations and the number of digital program services at each station is sufficient. Another user can decide that a station list should include all the information about every program service. The user's preferences can influence the speed and manner in which the program list is presented.

FIG. 8B is a flowchart showing additional details of selected portions of the flowchart of FIG. 7 according to another implementation. As discussed above, both branches of the method of generating a station list include blocks of seeking the next station (digital or any, depending on the branch) and adding the station to the station list. The implementation of FIG. 8B can be based on a set of commands that includes a command, designated "ScanStart" wherein PMD 15 commands accessory 10 to execute a sequence of seek operations without requiring separate commands from the PMD. While the lingo implementation described above, and in greater detail below, does not include such a command, other lingo implementations can.

At a block 425, the PMD sends a ScanStart command to the accessory, and the accessory begins the scan and reports back to the PMD. For example, at a sequence of blocks 430, the accessory returns the next station and the PMD adds it to the list. For simplicity, these two operations are shown as a single block. This sequence continues until a block 435, where the accessory returns the penultimate station in the list, and a block 440, where the accessory returns the last station in the list. The accessory can flag the returned frequency as the last in the scan if it delays sending a result until it has done another seek. Otherwise, the accessory can return a result that signifies that it has reached the end of the scan, i.e., that the previous returned frequency was the last.

The discussion in connection with FIG. 8A's implementation of providing additional program service information for digital stations applies here as well. That is, the extra information can be obtained at each station stop or it can be obtained in a subsequent scan. Although FIG. 8B shows the PMD adding each station to the list after the accessory returns the frequency, alternative embodiments can have the accessory store the entire list in its local storage, and then return the whole list to the PMD.

The following description deals with a representative RF tuner lingo configured to accommodate digital radio such as HD radio. The commands include ones sent by the PMD to the accessory and ones sent by the accessory to the PMD. The commands sent by the PMD to the accessory can include commands for interrogating the accessory or for setting the accessory's state parameters. The commands sent by the accessory to the PMD can include commands sent in response to specific commands from the PMD, commands alerting the PMD that previously requested data is available, or commands alerting the PMD that some state parameters have changed.

Commands can include data identifying the particular type of command. Commands sent from the accessory can include data relating to the command to which the accessory is responding. Commands can also include data, as described in some of the examples above. It is convenient to describe some of the commands in terms of what the PMD sends and how the accessory responds. In some instances, the PMD's sending a command is enabled by the PMD's having previously obtained information from the accessory that the accessory has the requisite capability to support the command.

In response to some commands, the accessory can send an acknowledgment ("ACK") command on completion of a command received from a PMD. An ACK command can include requested data or can be sent to indicate that a command that does not return any data has finished. In some implementations the ACK command can also be used to provide a failure indication.

A number of commands can deal with tuning the accessory. The PMD can send a command to initiate seeking of a specified type. The accessory can send a command when a seek operation completes. The types of seek and the types of termination were discussed above in conjunction with the exchange of commands shown in FIG. 6. The command sent on completion can include the current tuner frequency, which is assumed to be the result of the seek operation, and possibly the current station's RSSI signal strength level. If an HD signal seek was requested, the tuner can be specified to tune to the next frequency containing HD content, but can be specified not to select an analog or HD program service.

A number of commands can deal with the types of notifications the accessory is to provide, and this can be accomplished by setting appropriate masks in the accessory. When appropriate mask bits are set, corresponding notifications can be sent, asynchronously in at least some circumstances.

The PMD can send a command to get an accessory's current RDS/RBDS data notification mask or HD data notification mask. In response, the accessory can be specified to send a command with the RDS/RBDS or HD data notification mask. The PMD can send a command to set the accessory's RDS/RBDS data-ready notification mask or HD data-ready notification mask.

Assuming appropriate notification mask bits are set, the accessory can send a command when RDS/RBDS data or HD data is ready. After a notification command is sent, the accessory's associated RDS/RBDS data-ready status bit or HD data-ready status bit can be specified to be cleared. In one implementation, only RDS/RDBS/HD-Radio raw mode is supported for HD Data. If raw mode is not enabled, the accessory can be specified not to send the command. PSD raw data is sent with the HD program the PSD data came from.

The PMD can send a command to get the status notification mask from the accessory. This mask indicates which state changes will invoke a notification change command from the accessory. In response, the accessory can send a command to indicate which state changes will invoke a notification change command from the accessory.

The PMD can send a command to set the status change notification mask. The status notification mask indicates which state changes will invoke a notification change command from the accessory. The accessory can send a command asynchronously to report each enabled status change. After a notification has been sent, the status bits can be specified to be automatically cleared so they are ready to receive the next status change.

The lingo does not require that the PMD be constrained to wait for notifications. Rather, the PMD can send a command to get the accessory's current RDS/RBDS data-ready status or current HD data-ready status. In response to such a command, the PMD can send a command that specifies which RDS/RBDS data values or HD data values are available to be read.

In addition to queries regarding notification masks and the like, a number of the commands can deal with the PMD querying the accessory to find out configuration and state information. As noted above, the nature of subsequent commands can depend on the information obtained as a result of such queries. The information sought and provided by commands can include some or all of the accessory's RF band, the accessory's capabilities, the accessory's control state, the current tuner frequency and signal strength threshold level, the current tuner mode state, the current tuner seek threshold value (representing the minimum signal strength that allows a tuner channel to be recognized during the seek process), and the current tuner status state. A few of these queries will be elaborated on below.

The PMD can send a command to get an accessory's RF band information. In response, the accessory can be specified to send a command to report its tuner band state. The accessory can send a command to query an attached accessory's capabilities and determine what features the accessory supports. In response, the accessory can be specified to send a command with a payload specifying its capabilities, such as the band, control, mode, and status commands of the RF tuner lingo.

The accessory can send a command to get or set an accessory's current accessory tuner frequency and signal strength level. In response, the accessory can be specified to send a command providing the appropriate values. In some implementations, the tuner frequency can be expressed in kilohertz: for example, 76000 for 76.0 MHz, 87500 for 87.5 MHz, or 107900 for 107.9 MHz. Valid ranges are 87500 to 107900 for the European/U.S. FM band and 76000 to 89900 for the Japanese FM band.

The PMD can send a command to obtain the accessory's current tuner status state. In response, the accessory can be specified to send a command. The query can be used to poll the accessory's status if the accessory does not support status change notifications.

A number of commands can deal with setting the accessory state. The PMD can send a command to set the accessory's tuner band. In response, the accessory can be specified to send the PMD an ACK command with the command status. The PMD can send a command to control an accessory's state. In response, the accessory can be specified to return an ACK command with the command status. RF tuner state information, such as tuner frequency, band, and so on, can be specified to be preserved by the accessory across tuner on and off cycles, assuming accessory power is available.

The PMD can send a command to set the current tuner mode. In response, the accessory can be specified to send an RF tuner lingo ACK command with the command status. The PMD can send a command to set the accessory's seek RSSI signal strength threshold.

A number of commands can deal with getting RDS and/or digital radio (e.g., HD radio) data. The PMD can send a command to get raw or unprocessed RDS/RBDS data or raw HD data from an accessory that supports the RDS/RBDS or HD data capability. In response, the accessory can be specified to send a command when it has RDS/RBDS or HD data ready. Upon sending the command providing the data, the accessory can be specified to clear its internal RDS/RBDS or HD Data ready status for the data type being read (until the next data is ready). In the specific implementation of HD radio, PSD raw data is the PSD stream data embedded in one or more Audio Transport PDUs. One or more PSD raw data streams can make up the PSD PDU which can be parsed for ID3 tag data. Each PSD raw data comes from an Audio Transport PDU for a specific HD program which is indicated by the HD Program Index field.

The PMD can send a command to get the count of HD program services broadcast at the current tuner frequency. In the accessory can be specified to send a command with the count of HD program services available. The command can also provide an indication whether the station has analog programming or not.

The PMD can send a command to tune to an HD program service at the tuner frequency. The command can have a setting that disables all audio decoding and output. This allows the PMD to retrieve information for all available HD programs prior to selecting a program's audio to be decoded and output.

The PMD can send a command to get the current tuned HD program service. In response, the accessory can be specified to send a command with the current HD program service. The returned value can be the tuned HD program service, also specifying if the analog program is currently tuned, or if audio decoding and output is currently disabled due to a previous command or due to just having tuned to the station's frequency.

While the above is a complete description of specific embodiments, the above description should not be taken as limiting the scope as defined by the claims.

What is claimed is:

1. A method for use in an accessory having a digital radio receiver, the method comprising:
receiving a first command at an input interface to tune to a given frequency;
in response to the first command, tuning to the given frequency;
disabling decode of digital audio data received from the given frequency;
determining a number of digital radio program services at the given frequency; and
providing, at an output interface, information representative of the number of digital radio program services at the given frequency, the information including program service data (PSD) metadata provided at the given frequency.

2. The method of claim 1 additionally comprising:
providing information regarding each of the digital radio program services in response to a second command received at the input interface; and
providing decoded audio data associated with a selected digital radio program service in response to a third command received at the input interface.

3. The method of claim 2 wherein the first command received at the input interface is provided by a media player and the media player, upon receiving information regarding a first digital radio program service, displays that information while waiting for receipt of information regarding a second digital radio program services at the given frequency.

4. The method of claim 3 wherein the media player, upon receiving information regarding a given digital radio program service, displays that information only after it has information about all the digital radio program services at the given frequency.

5. A non-transitory computer readable medium storing program instructions which when executed cause an accessory to perform a method for use in the accessory having a digital radio receiver, the method comprising:
receiving a first command at an input interface to tune to a given frequency;
in response to the first command, tuning to the given frequency;
disabling decode of digital audio data received from the given frequency;
determining a number of digital radio program services at the given frequency; and
providing, at an output interface, information representative of the number of digital radio program services at the given frequency, the information including program service data (PSD) metadata provided at the given frequency.

6. The medium of claim 5 additionally comprising:
providing information regarding each of the digital radio program services in response to a second command received at the input interface; and
providing decoded audio data associated with a selected digital radio program service in response to a third command received at the input interface.

7. The medium of claim 6 wherein the first command received at the input interface is provided by a media player and the media player, upon receiving information regarding a first digital radio program service, displays that information while waiting for receipt of information regarding a second digital radio program services at the given frequency.

8. The medium of claim 7 wherein the media player, upon receiving information regarding a given digital radio program service, displays that information only after it has information about all the digital radio program services at the given frequency.

9. An audio accessory comprising:
a digital radio receiver;
a controller coupled to the digital radio receiver to control the digital radio receiver;
an input interface coupled to the controller, the input interface to receive a first command to tune to a given frequency, the controller to tune the digital radio receiver to the given frequency in response to the first command, disable decode of digital audio data received at the given frequency, and determine a number of digital radio program services at the given frequency;
an output interface coupled to the controller, the controller to provide, at the output interface, information representative of the number of digital radio program services at the given frequency, the output interface configured to deliver the information to a media player interface.

10. The audio accessory as in claim 9 wherein the input interface is additionally configured to receive a second command to cause the controller to provide decoded audio data associated with a selected program service.

11. The audio accessory as in claim 10 further comprising an analog audio output interface coupled to the digital radio receiver to provide audio output from the audio accessory.

12. A method for use in an accessory having a digital radio receiver, the method comprising:
receiving a mode command configuring the accessory to operate in one of a first mode, a second mode, or a third mode, wherein in the first mode the accessory is configured to search only radio stations providing digital audio content, wherein in the second mode the accessory is configured to search all radio stations, and wherein in the third mode the accessory is configured to search digital radio stations providing tagging information including radio stations providing digital radio metadata and radio stations providing RDS metadata;
receiving a command to search for a receivable radio signal in a given frequency band;
searching for the receivable radio signal, in response to the command to search when the mode command has configured the accessory to operate in the first mode, only in receivable radio signals that include digital audio content in the given frequency band;

searching for the receivable radio signal, in response to the command to search when the mode command has configured the accessory to operate in the second mode, in any receivable radio signal in the given frequency band; and searching for the receivable radio signal, in response to the command to search when the mode command has configured the accessory to operate in the third mode, in receivable radio signals that include digital radio metadata or RDS metadata.

13. The method of claim 12 wherein the mode command is incorporated into the command to search.

14. The method of claim 12 wherein the mode command is sent as a separate command before the command to search is sent.

15. The method of claim 12, wherein the digital radio stations providing digital radio metadata include the radio stations providing digital audio content and the digital radio stations providing RDS metadata include analog radio stations having RDS capability.

16. The method of claim 12, additionally comprising:
receiving digital radio data from a radio station providing a digital radio program service;
parsing the digital radio data to retrieve program service data (PSD) metadata associated with the digital radio program service; and
providing the PSD metadata at a data interface of the accessory.

17. A non-transitory computer readable medium storing program instructions which when executed cause an accessory to perform a method for use in the accessory having a digital radio receiver, the method comprising:
receiving a mode command configuring the accessory to operate in one of a first mode, a second mode, or a third mode, wherein in the first mode the accessory is configured to search only radio stations providing digital audio content, wherein in the second mode the accessory is configured to search all radio stations, and wherein in the third mode the accessory is configured to search digital radio stations providing tagging information including radio stations providing digital radio metadata and radio stations providing RDS metadata;
receiving a command to search for a receivable radio signal in a given frequency band;
searching for the receivable radio signal, in response to the command to search when the mode command has configured the accessory to operate in the first mode, only in receivable radio signals that include digital audio content in the given frequency band;
searching for the receivable radio signal, in response to the command to search when the mode command has configured the accessory to operate in the second mode, in any receivable radio signal in the given frequency band; and
searching for the receivable radio signal, in response to the command to search when the mode command has configured the accessory to operate in the third mode, in receivable radio signals that include digital radio metadata or RDS metadata.

18. The medium of claim 17 wherein the mode command is incorporated into the command to search.

19. The medium of claim 17 wherein the mode command is sent as a separate command before the command to search is sent.

20. The medium of claim 17, wherein the digital radio stations providing digital radio metadata include the radio stations providing digital audio content and the digital radio stations providing RDS metadata include analog radio stations having RDS capability.

21. The medium of claim 17, the method additionally comprising:
receiving digital radio data from a radio station providing a digital radio program service;
parsing the digital radio data to retrieve program service data (PSD) metadata associated with the digital radio program service; and
providing the PSD metadata at a data interface of the accessory.

\* \* \* \* \*